(12) United States Patent
Kauranen et al.

(10) Patent No.: US 11,986,972 B2
(45) Date of Patent: May 21, 2024

(54) SYSTEM AND METHOD FOR REPAIRING PLYWOOD

(71) Applicant: Raute Oyj, Nastola (FI)

(72) Inventors: Erkki Kauranen, Lahti (FI); Antti Mäkinen, Nastola (FI)

(73) Assignee: Raute Oyj, Nastola (FI)

( * ) Notice: Subject to any disclaimer, the term of this patent is extended or adjusted under 35 U.S.C. 154(b) by 393 days.

(21) Appl. No.: 17/275,510

(22) PCT Filed: Aug. 26, 2019

(86) PCT No.: PCT/FI2019/050598
§ 371 (c)(1),
(2) Date: Mar. 11, 2021

(87) PCT Pub. No.: WO2020/053475
PCT Pub. Date: Mar. 19, 2020

(65) Prior Publication Data
US 2022/0032491 A1 Feb. 3, 2022

(30) Foreign Application Priority Data
Sep. 12, 2018 (FI) ..................................... 20185760

(51) Int. Cl.
*B27D 5/00* (2006.01)
*B27G 1/00* (2006.01)
*G01N 21/898* (2006.01)

(52) U.S. Cl.
CPC ............... *B27D 5/00* (2013.01); *B27G 1/00* (2013.01); *G01N 21/8986* (2013.01)

(58) Field of Classification Search
CPC ......... B27D 5/00; B27G 1/00; G01N 21/8986
(Continued)

(56) References Cited

U.S. PATENT DOCUMENTS

| 3,120,861 A | 2/1964 | Finlay et al. |
| 3,452,791 A | 7/1969 | Roberts, Jr. |

(Continued)

FOREIGN PATENT DOCUMENTS

| AT | 1104202 U2 | 3/2010 |
| CN | 102159368 A | 8/2011 |

(Continued)

OTHER PUBLICATIONS

US 2007/0034297 A1, Feb. 15, Zielke et al. (Year: 2007).*
(Continued)

*Primary Examiner* — Douglas A Hess
(74) *Attorney, Agent, or Firm* — Meunier Carlin & Curfman LLC

(57) ABSTRACT

The present invention relates to a system for repairing a plywood panel. The system comprises an input section and an output section wherein at least one of these comprises a support structure for a stack of the plywood panels. The system may further comprise a detection device for scanning a plywood panel and a repairing device for performing a repair operation for the plywood panel. Moreover, the system may comprise a transport device for transporting a plywood panel from the input section to the output section and a control device for generating a control signal to the repairing device in response to a detection of a defect in the plywood panel on the basis of information obtained with the detection device. The invention also relates to a method implementable by the system.

14 Claims, 3 Drawing Sheets

(58) Field of Classification Search
USPC ...................................................... 198/339.1
See application file for complete search history.

(56) References Cited

U.S. PATENT DOCUMENTS

| | | | | |
|---|---|---|---|---|
| 3,552,252 | A * | 1/1971 | Maxey | B23D 36/0066 83/365 |
| 4,221,974 | A * | 9/1980 | Mueller | G06Q 10/043 250/559.48 |
| 4,308,298 | A * | 12/1981 | Chen | B27G 1/00 427/140 |
| 4,614,555 | A | 9/1986 | Smith et al. | |
| 4,984,172 | A | 1/1991 | Luminari | |
| 5,892,808 | A * | 4/1999 | Goulding | G01N 23/046 382/152 |
| 11,173,625 | B2 * | 11/2021 | Su | B27D 1/10 |
| 2012/0018042 | A1 | 1/2012 | Kaureanen et al. | |
| 2012/0186700 | A1 | 7/2012 | Tolonen et al. | |
| 2014/0046471 | A1 | 2/2014 | Bamford et al. | |

FOREIGN PATENT DOCUMENTS

| | | |
|---|---|---|
| DE | 10223831 A1 | 5/2002 |
| DE | 202008008428 U1 | 11/2009 |
| DE | 10 2016 101502 A1 | 8/2017 |
| EP | 2337658 B1 | 8/2012 |
| EP | 0294038 A1 | 12/2012 |
| JP | 112304 | 11/1991 |
| JP | 2008201074 | 9/2008 |
| RU | 2565723 | 10/2015 |
| RU | 2573332 | 1/2016 |
| SU | 1484283 A3 | 5/1989 |
| WO | 2009156388 A1 | 6/2009 |
| WO | 20091563882 A2 | 12/2009 |

OTHER PUBLICATIONS

US 2008/0152876 A1, Jun. 26, Magnusson et al. (Year: 2008).*
US 2015/0202790 A1, Jul. 23, Patterson et al. (Year: 2015).*
US 2016/0046037 A1, Feb. 18, Ogden et al. (Year: 2016).*
Search Report in connection to RU Application No. 2021106240, dated Nov. 15, 2022.
Search Report for Finnish Application No. 20185760 dated Apr. 8, 2019.
International Search Report and Written Opinion for International Application No. PCT/FI2019/050598 dated Nov. 28, 2019.
International Preliminary Report on Patentability for International Application No. PCT/FI2019/050598 dated Oct. 7, 2020.
Translation of Notice of Reasons for Rejection of Corresponding Japanese patent application 2021-512209, dated Jul. 4, 2023. 4p.
Notice of Opposition to a European Patent received in EP Application No. 19769195.9, issued Mar. 1, 2024, 46 pages.

* cited by examiner

SYSTEM AND METHOD FOR REPAIRING PLYWOOD

CROSS-REFERENCE TO RELATED APPLICATIONS

This application is a national stage application filed under 35 U.S.C. § 371 of PCT/FI2019/050598 filed Aug. 26, 2019, which claims priority to and benefit of Finnish patent application serial number 20185760 filed Sep. 12, 2018, the contents of which are incorporated herein by reference in their entirety.

TECHNICAL FIELD

The invention concerns in general the technical field of a manufacturing of wood products. More particularly, the invention concerns a repairing of plywood products.

BACKGROUND

Manufacturing of plywood is a process comprising of a plurality of stages. In a big picture main stages are a preparation of veneer sheets from logs, preparation of plywood from the veneer sheets and a finalization of the plywood. The finalization of the plywood comprises a repairing phase in which a quality of the plywood is inspected and necessary measures to repair defects found during the inspection are taken. Some non-limiting examples of the defects are knots, knot holes, cracks, splits, color deviations and similar.

In prior art solutions the repair of the plywood panels is performed in a production line type repairing solution. There, the plywood panels are brought with a conveyor line to an inspection device which may e.g. scan the plywood panel in question, analyzes the scanned data and generates a repair command to at least one repair tool. The repair tool(s) performs an applicable repair operation to the defect of the plywood panel when the panel under repair advances in the production line and when the repair is performed the plywood panels may be collected at stacks at the end of the production i.e. repair line. This kind of approach is taken in a prior art document U.S. Pat. No. 4,984,172.

The drawback of the prior art solutions as described above is that the repairing lines according to prior art are expensive to acquire, but also expensive to use especially if all costs are taken into account. Part of the costs incur due to a need of a large floor area needed for establishing the repairing line. Moreover, an installation of the repairing line is difficult and challenging. Hence, there is need to develop alternative solutions for establishing the repairing of the wood panels which mitigate at least in part the above described drawbacks.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a system and a method for repairing at least one plywood panel.

The objectives of the invention are reached by a system and a method as defined by the respective independent claims.

According to a first aspect, a system for repairing at least one plywood panel is provided, the system comprising: an input section for inputting plywood panels in the system, an output section for outputting the plywood panels from the system, wherein at least one of the following: the input section, the output section comprises a support structure for a stack of the plywood panels; the system further comprising: a detection device for scanning a plywood panel in the system; a repairing device for performing a repair operation for the plywood panel; a transport device for transporting a plywood panel from the input section to the output section; and a control device for generating a control signal to the repairing device in response to a detection of a defect in the plywood panel on the basis of information obtained with the detection device.

The detection device may be arranged to scan the plywood panel in at least one of the following: in the input section, in the output section.

The detection device may be arranged to scan the plywood panel residing at topmost or at bottommost in the stack of the plywood panels.

The detection device may also be arranged to move at least in part over the plywood panel under scanning.

Alternatively or in addition, the repairing device may be arranged to perform the repair operation in at least one of the following: in the input section, in the output section.

The repairing device may also be arranged to perform the repair operation to the plywood panel residing at topmost or at bottommost in the stack of the plywood panels.

The repairing device may further be configured to perform the repair operation to the plywood panel at a same position as it is scanned with the detection device.

The transport device may be arranged to travel between the input section and the output selection along rails arranged in a frame structure of the system.

For example, the transport device may comprise a plurality of gripping devices for gripping the plywood panel under transport.

The system may further comprise a holder device for holding the plywood panel.

Still further, the system may further comprise a hoisting apparatus for adjusting a position of the plywood panel in the system.

Alternatively or in addition, the system may further comprise a conveyor device for conveying a stack of plywood panels to the input section of the system.

The system may further comprise a conveyor device for conveying a stack of plywood panels from the output section of the system.

According to a second aspect, a method for repairing at least one plywood panel is provided, the method comprising: receiving, in an input section of a system, a plurality of plywood panels; transporting the plywood panels, one by one, from the input section to an output section; scanning, by a detection device, a plywood panel in the system; performing, by a repairing device, a repair operation to the plywood panel in response to a receipt of a control signal from a control device configured to generate the control signal to the repairing device in response to a detection of a defect in the plywood panel on the basis of information obtained with the detection device; wherein the method further comprising: handling the plurality of the plywood panels as a stack with a support structure in at least one of the following: the input section of the system, the output section of the system.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1:
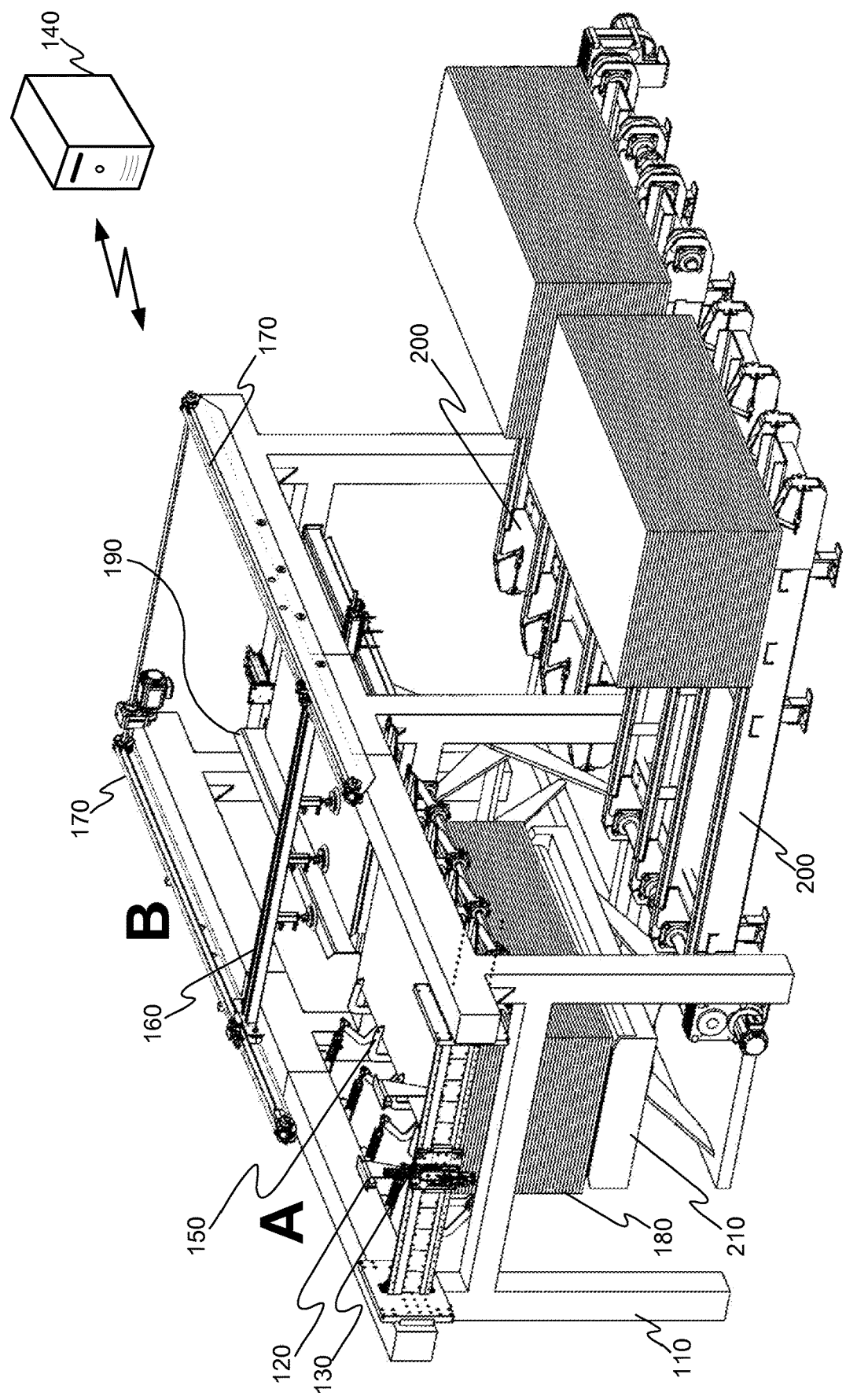
FIG. 1 illustrates schematically a plywood panel repairing system according to an embodiment of the invention.

FIG. 1 illustrates schematically a plywood panel repairing system according to an embodiment of the invention. The plywood panel repairing system may refer to an entity comprising necessary devices for determining if a plywood panel input to the system comprises a predetermined defect and necessary devices for performing at least one repair operation to the plywood panel in case there is determined one or more predetermined defects. The system comprises at least two sections: input section (referred with symbol A in FIG. 1) and output section (referred with symbol B in FIG. 1). The plywood panels are transported between the sections A, B typically from the input section A to the output section B. The system according to an embodiment of the invention may comprise a frame structure 110 into which at least part of the devices belonging to system as will be described may be mounted either in a fixed manner or movably. In the non-limiting example of the repairing system as schematically illustrated in FIG. 1 the input section is arranged to be the side in which the repair of the plywood panel may be performed. The repairing of the plywood panel may require that the repairing system comprises a detection device 120 by means of which the plywood panel under repair may be scanned and by analyzing the data obtained by the scanning it may be determined if a repair operation shall be done with respect to the plywood panel in question. A non-limiting example of an applicable detection device 120 may be an image capturing device, such as a camera, or a laser profile sensor. The detection device 120 may be movably arranged in the frame structure 110 so that it may be arranged to travel over a plywood panel under scanning for obtaining necessary information on the plywood panel. For example, in the nonlimiting example as depicted in FIG. 1 the detection device 120 may be arranged to travel over the input section A. Furthermore, the system may comprise at least one repairing device 130 i.e. the tool by means of which the detected defect may be repaired. The repairing device 130 may e.g. comprise a tool for mechanically modifying the detected defect as well as a tool for inputting a substance to the defect or the modified defect. For example, the repairing device 130 may be a puttying device. In other words the repairing system may be configured to operate so that in the input section the plywood panel under repair is scanned with the detection device 120 and the data generated by scanning is analyzed. In response to a detection that there is a predetermined defect in the plywood panel, a control signal may be generated to the repairing device 130 for performing the repair operation. The overall control of the repairing system, and, hence, a control of the scanning operation, the analysis and the control of the repairing device 130, may be executed by a control device 140, which may be communicatively, and operatively, coupled to the other entities belonging to the system. The communication between the entities and the control device 140 may be implemented either in a wired manner or wirelessly by applying known communication technologies, for example. Still further, in some embodiment the repairing system may comprise one or more holding devices 150 by means of which the plywood panel under repair may be held in place. This is important when the scanning operation is performed but also when the control signal for the repairing device 130 is generated in order to achieve the repairing device 130 to perform the repair operation in a correct position of the plywood panel. Moreover, holding the plywood panel in place with the holding device or devices may be necessary during the repair operation. Advantageously both the scanning operation and the repair operation are performed to plywood panel so that the panel remains exactly at the same position during these both operations. Alternatively or in addition, it may be arranged that the system is configured to monitor if the plywood panel moves between the scanning operation and the repair operation and to determine an amount of the motion. In this manner it is possible to take into account the change in position for the generation of the control signals to the repairing device 130. A measurement of the change in position may be performed with any applicable measurement device or system. A non-limiting example of an applicable holding device 150 may be a press foot, which may be arranged to hold the plywood panel under repair under control of the control device 150 and to release the plywood panel e.g. when the repair operation is ready. Still further, the plywood panel repairing system may comprise a transport device 160 for transporting a plywood panel between the input section A and the output section B. In the implementation of the system as schematically illustrated in FIG. 1 the transport device 160 may be implemented with a device having a plurality of gripping devices by means of which the plywood panel to be transported may be gripped. The gripper devices may be such that they may move in a vertical direction for reaching the plywood panel and have means, such as vacuum suction or vacuum cup, to grip the object in question. Moreover, the implementation of the transport device 160 may be based on rails mounted on the frame structure 110 along which rails the transport device 160 may be caused to travel. The transport device 160 comprises a motion generation device, such as an electric motor, for generating a force causing the motion of the transport device 160 for achieving the transport of the plywood panel. In other words, the transport device 160 may be controlled to transport a plywood panel between the input section A and the output section B, typically from the input section A to the output section B and release the transported plywood panel there.

The system according to the present invention allows a processing of the plywood panels in a stack at least in one section A, B of the system. In other words the system may be arranged so that it may be configured to receive the plywood panels to be repaired if necessary in a stack 180 in the input section, as illustrated in FIG. 1 as a non-limiting example. Hence, the system may be configured to, in the embodiment of FIG. 1, repair the topmost plywood panel in the stack of the plywood panels. Here, the stack refers to a pile comprising a plurality of the plywood panels. When the repair, comprising at least the scanning phase and the repair phase, is ready, the transport device 160 may be configured to transport the topmost panel from the input section A to the output section B. The scanning of the next plywood panel in the stack 180 may be initiated so that the scanning may be synchronized at least in part concurrently with the transport or it may be initiated when the repaired plywood panel resides in the output section. In the embodiment of FIG. 1 the plywood panels transported to the output section B may be received by a support structure thus forming a stack from the plywood panels gone through the repair. The support structure may refer to a platform, such as a scissor lift, or to dedicated rack for collecting the plywood panels as non-limiting examples.

The system according to the embodiment of FIG. 1 may comprise further entities, such as one or more conveyor devices 200, by means of which the plywood panels may be conveyed to and from the system. A non-limiting example of an applicable conveyor device 200 may be a chain conveyor as schematically illustrated in FIG. 1. The plywood panels may be transported at least in one direction (i.e. either to the system or from the system or both) in a stack as illustrated in the non-limiting example according to FIG. 1. Moreover, the system may further comprise one or more hoisting devices 210 in either the input section or in the output section. The hoisting machines may be configured to receive the plywood panel or the stack of the plywood panels and adjust a height of it at least in vertical direction so that the repair operation as described may be performed. In other words, the height may be adjusted so that the scanning and the repair operation may be performed. Moreover, the adjustment of height may be controlled so that the height is adjusted continuously in response to a change of height of the stack. In other words, an upper layer of the stack may be maintained approximately at the same level. In order to achieve this, there may be arranged sensors e.g. in the frame structure for obtaining data from which the level of the upper surface of the stack of plywood panels may be determined.

In the embodiment of the invention as schematically illustrated in FIG. 1 the repair i.e. the scanning operation and the repair operation are arranged in the input section of the repair system. However, the present invention may also be implemented so that the scanning and the repair, and, thus, the detection device 120 and the repairing device 130 may be arranged in the output section of the system. In such an embodiment the plywood panel may be conveyed from the input section to the output section wherein the repair is performed by performing the scanning operation and the repair operation as described. Naturally, necessary holding devices may be arranged in the output section. In the embodiment, the plywood panels may be collected at the output section in a stack for transporting the plywood panels in a stack out from the system. Moreover, the input section may be implemented in a similar way as in the embodiment of FIG. 1 in which the plywood panels to be repaired are brought in a stack to the system. Alternatively, it may be arranged that the plywood panels are input to the system with a conveyor device so that the transport device of the system grips the input plywood panel and conveys it to the output section for repair.

The input of the stack of plywood panels 180 in the embodiment of FIG. 1 is arranged underneath an operational level of the system i.e. the level where the devices involved in the repair are operable. In the embodiment the height may be adjusted with the hoisting device 180. According to another embodiment the input of the plywood panels for repair may also arranged so that plywood panels are input above the operational level of the system e.g. in such a manner that the stack of plywood panels are hoisted above the operational level and the bottommost plywood panel is taken for repair. In such an embodiment the scanning device 120 as well as the repairing device 130 may be positioned so that they may perform the scanning operation as well as the repair operation to the bottommost plywood panel in the stack. For example, the positioning may be implemented so that they are upside down with respect to the embodiment of FIG. 1. A structure of the hoisting device 210 may advantageously be such that the stack of plywood panels, and especially their bottom surface is accessible by the devices being involved in the repair. Furthermore, the transport device 170 may be implemented so that it may release the bottommost plywood panel from the stack 180 and to transport it to the output section. Similarly, if the system is implemented so that the repair is to be done in the output section, the necessary devices, such as 120 and 130, may be positioned there in the same manner as described above in order to repair the bottommost plywood panel collected therein. In such an embodiment the output section is configured so that there is arranged a hoisting machine which adjusts a height of the plywood panel residing in the support structure in the output section so that the transported plywood panel may be positioned as the bottommost plywood panel in the stack in the output section.

Figure 2A:
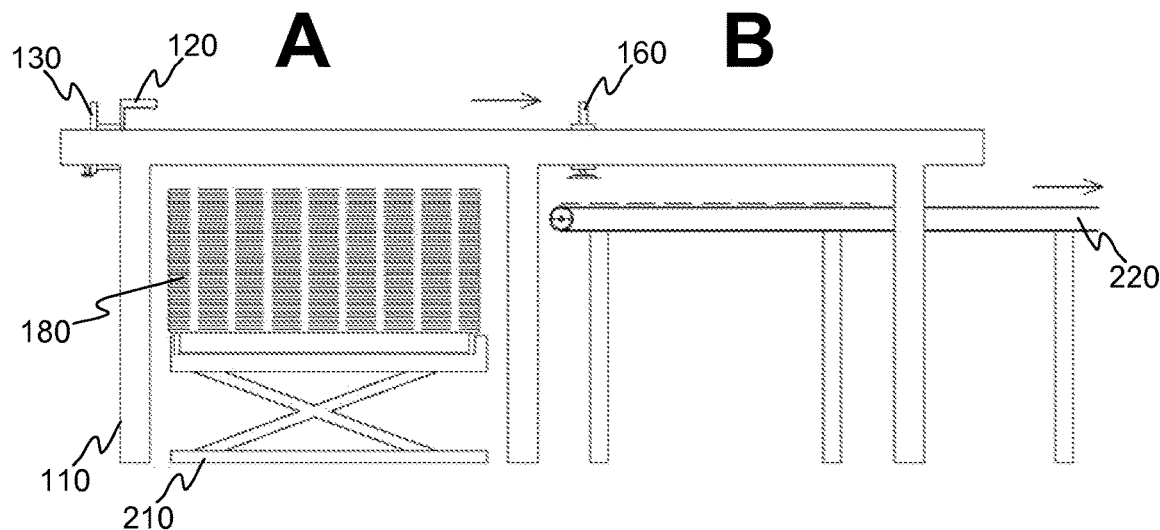
FIGS. 2A and 2B illustrate schematically another embodiment of the invention.
Figure 2B:
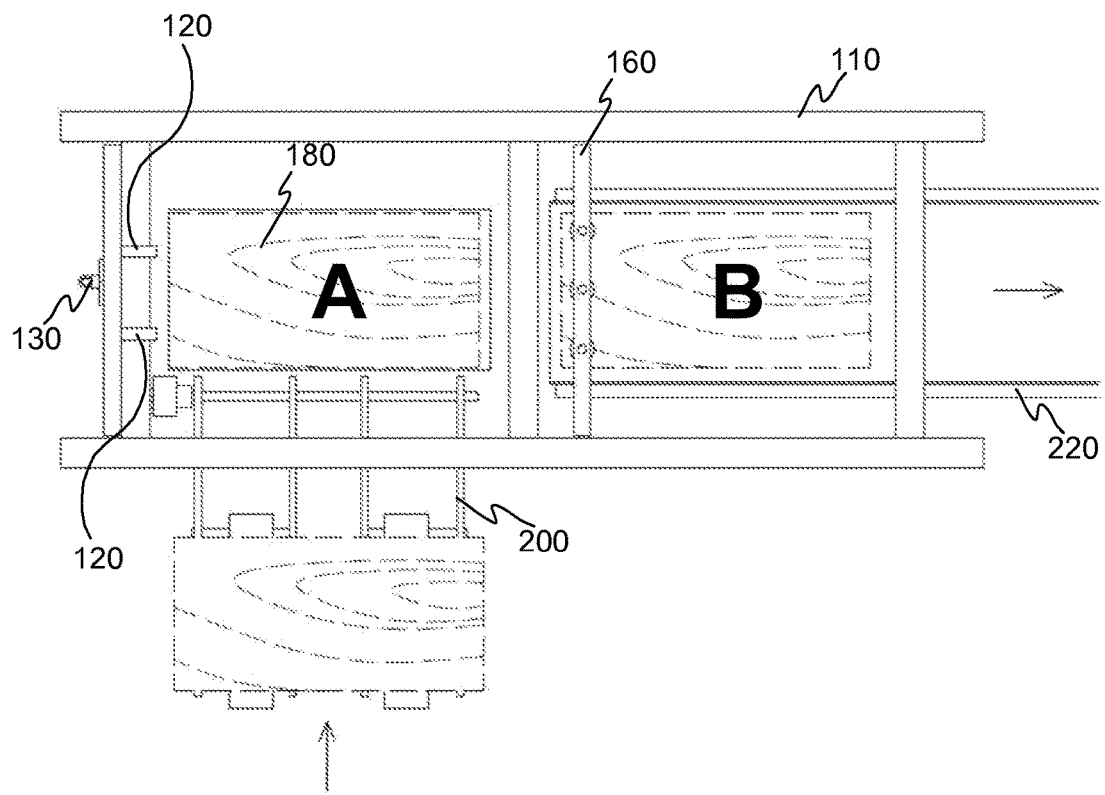

In the embodiment as illustrated in FIG. 1 the conveyor devices 200 are arranged to convey the stack of plywood panels 180 from the side of the system i.e. a direction of the motion of the conveyor devices 200 is transversal to a direction of the motion of the transport device 160 of the system. However, the present invention is not only limited to such an arrangement but at least one conveyor device 200 may be arranged to convey the stack of the plywood panels to or from the system from the end of the frame structure 110. Then, the directions of the motions of the conveyor device 200 and the transport device 160 are parallel to each other. As already mentioned the present invention may be applied in a plurality of implementations of the repair system. A further example on the implementation is schematically illustrated in FIGS. 2A and 2B which illustrate an embodiment of the invention from two perspectives. FIG. 2A illustrates a side view of the embodiment whereas FIG. 2B provides a bird-eye view to the same embodiment. The embodiment as schematically illustrated is such that the repair is performed in the first section A. The plywood panels may be input as a stack 180 conveyed to a hoisting device 210 with a conveyor device 200 wherein the topmost plywood panel is scanned with a detection device 120 and a repairing operation, if any, is performed with repairing device 130. In response to the repair the plywood panel is transported to the output section B with a transport device 160 configured to move along the frame structure 110 of the system. In the embodiment as schematically illustrated in FIGS. 2A and 2B the repaired plywood panels are taken out from the system with a second conveyor device 220. Hence, the transport device 160 may be configured to transport the plywood panel in question from the input section A to the output section B and release the plywood panel in the output section so that it lays down to the conveyor device 220, e.g. on a belt of the conveyor device 220.

Figure 3A:
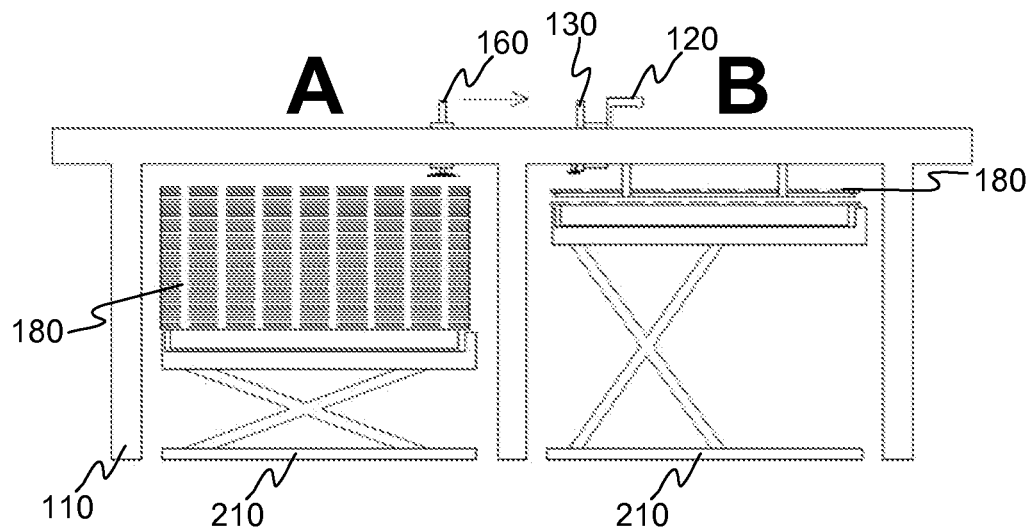
FIGS. 3A and 3B illustrate schematically a still further embodiment of the invention.
Figure 3B:
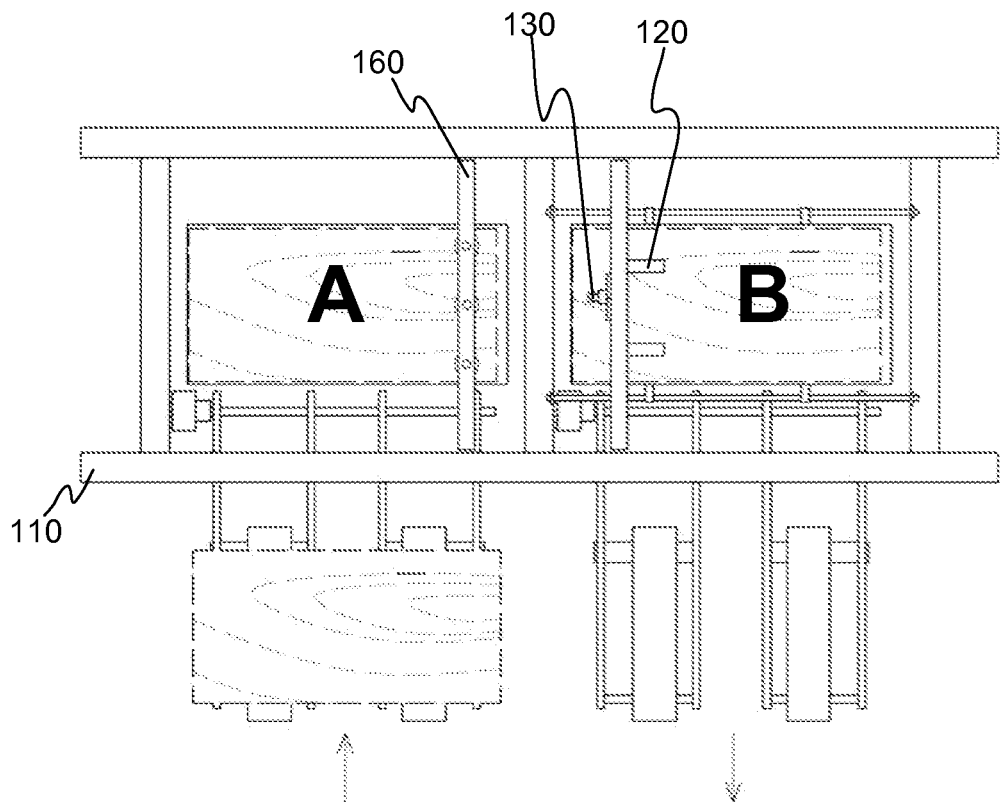

In FIGS. 3A and 3B are schematically illustrated such an embodiment in which the scanning and repairing operations are performed in the output section B. As schematically illustrated in FIGS. 3A and 3B the plywood panel under repair may be held above a stack of plywood panels already entered to the output section B and gone through the repair. In other words, the repair may be performed when the plywood panel under repair is held above the stack and in response the repair is finalized the plywood panel in question is laid to the stack as the topmost plywood panel. This kind of arrangement has an advantage that it is possible to arrange time for a substance used in the repair of the previous plywood panel to set, such as to dry, before the next plywood panel is positioned on top of it. In the embodiments as disclosed in FIGS. 3A and 3B the output of the plywood panels from the system is thus performed in a stack. The same arrangement may be done with a system in which the plywood panels are output from the system with a conveyor device (cf. FIGS. 2A and 2B). In such an embodiment the conveyor device is stopped so that the scanning and the repairing operations may be performed to a halted plywood panel.

In some embodiment the repair shall be performed on both sides of a plywood panel in question. In order to achieve this the system may further comprise a stack rotation device, which may be configured to receive the stack of the repaired plywood panels as an input, which stack is turned around and the turned around stack of the plywood panels may be input to the input section for repairing.

The system as described above may, thus, be configured to perform a method for repairing at least one plywood panel in which method in which a plurality of plywood panels is received in an input section A of a system. The plurality of the plywood panels may e.g. be received as a stack or via a conveyor device one by one. In the method, the plywood panels may be transported, one by one, from the input section A to an output section B. Moreover, in the method at least one plywood panel, typically all the plywood panels entering the system, may be scanned with a detection device 120 in the system and a repair operation may be performed, with a repairing device 130, to a plywood panel in response to a receipt of a control signal from a control device 140, which is configured to generate the control signal to the repairing device 120 in response to a detection of a defect in the plywood panel. The detection of the defect may be performed on the basis of information obtained with the detection device 120 e.g. through analyzing the obtained information. The method further comprises that the plurality of plywood panels is handled as a stack in at least one of the following: the input section (A) of the system, the output section (B) of the system. The handling of the plywood panels as the stack may e.g. refer to that the panels enter the system in the stack wherein at least some on the mentioned steps are performed to the plywood panels. Alternatively or in addition, the stack may be established in the output section e.g. by utilizing a support structure therein. For sake of clarity the steps disclosed in the method may be performed either in the input section A or in the output section B. Hence, the mutual order of the repair, the transport and the handling in stack is not strictly limited by the present invention. Further aspects relating to the method may have been described in the description of the system.

As becomes clear from the description above the present invention relates to a system by means of which it is possible to repair plywood panels. The repair comprises at least a detection operation and a repairing operation. The system is based on an inventive idea that in at least one section of the system, wherein the section refers to a sub-part of the whole system, the plywood panels under repair are handled in a stack of plywood panels. The section may either be an input section or an output section, wherein the plywood panels are transported between the mentioned sections. The system comprises necessary entities, such as devices and/or functionalities to perform the repairing. Even if the entity configured to perform the repairing is called as a system in the description herein it may also be understood as a device comprising necessary elements and entities, as described, for performing the repairing of the plywood panels.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A system for repairing at least one plywood panel, the system comprising:
    an input section for inputting plywood panels in the system,
    an output section for outputting the plywood panels from the system,
    wherein at least one of the following: the input section, the output section comprises a support structure configured to support a stack of the plywood panels,
    the system further comprising:
    a movable detection device for scanning a halted plywood panel in the system,
    a repairing device for performing a repair operation for the plywood panel halted for the repair operation,
    a transport device for transporting a plywood panel from the input section to the output section, and
    a control device for generating a control signal to the repairing device in response to a detection of a defect in the plywood panel on the basis of information obtained with the detection device,
    wherein the detection device and the repairing device are arranged in one of the following: the input section, the output section, and
    wherein the movable detection device is configured to move in a direction of a transport of the plywood panel from the input section to the output section.

2. The system of claim 1, wherein the detection device is arranged to scan the plywood panel in at least one of the following: in the input section, in the output section.

3. The system of claim 1, wherein the detection device is arranged to scan the plywood panel residing at topmost or at bottommost in the stack of the plywood panels.

4. The system of claim 1, wherein the detection device is arranged to move at least in part over the plywood panel under scanning.

5. The system of claim 1, wherein the repairing device is arranged to perform the repair operation in at least one of the following: in the input section, in the output section.

6. The system of claim 1, wherein the repairing device is arranged to perform the repair operation to the plywood panel residing at topmost or at bottommost in the stack of the plywood panels.

7. The system of claim 1, wherein the repairing device is arranged to perform the repair operation to the plywood panel at a same position as it is scanned with the detection device.

8. The system of claim 1, wherein the transport device is arranged to travel between the input section and the output section along rails arranged in a frame structure of the system.

9. The system of claim 1, wherein the transport device comprises a plurality of gripping devices for gripping the plywood panel under transport.

10. The system of claim 1, the system further comprising a holder device for holding the plywood panel.

11. The system of claim 1, the system further comprising a hoisting apparatus for adjusting a position of the plywood panel in the system.

12. The system of claim 1, the system further comprising a conveyor device for conveying a stack of plywood panels to the input section of the system.

13. The system of claim 1, the system further comprising a conveyor device for conveying a stack of plywood panels from the output section of the system.

14. A method for repairing at least one plywood panel, the method comprising:
receiving, in an input section of a system, a plurality of plywood panels,
transporting the plywood panels, one by one, from the input section to an output section,
scanning, by a movable detection device, a halted plywood panel in the system,
performing, by a repairing device, a repair operation to the plywood panel halted for the repair operation in response to a receipt of a control signal from a control device configured to generate the control signal to the repairing device in response to a detection of a defect in the plywood panel on the basis of information obtained with the detection device,
wherein the detection device and the repairing device are arranged in one of the following: the input section, the output section, and
wherein the detection device is movable in a direction of a transport of the plywood panel from the input section to the output section
wherein the method further comprising:
handling the plurality of the plywood panels as a stack with a support structure in at least one of the following: the input section of the system, the output section of the system.

* * * * *